May 4, 1954 P. VOLK 2,677,285
SPEED CONTROL APPARATUS FOR MACHINE DRIVES
Filed May 23, 1951 2 Sheets-Sheet 1
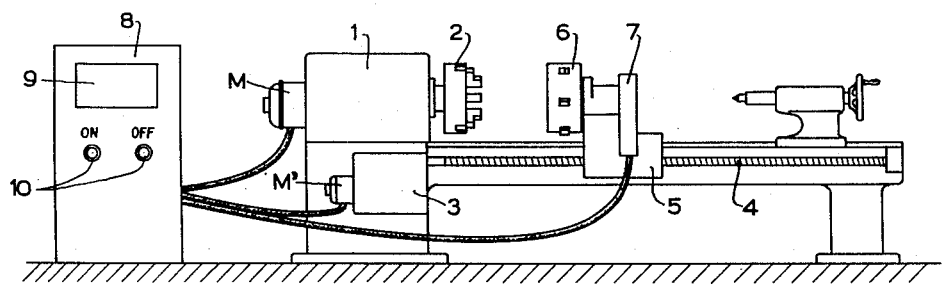
Fig. 1
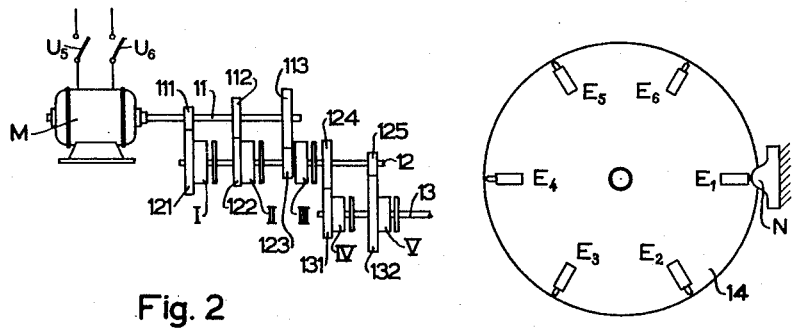
Fig. 2
Fig. 3
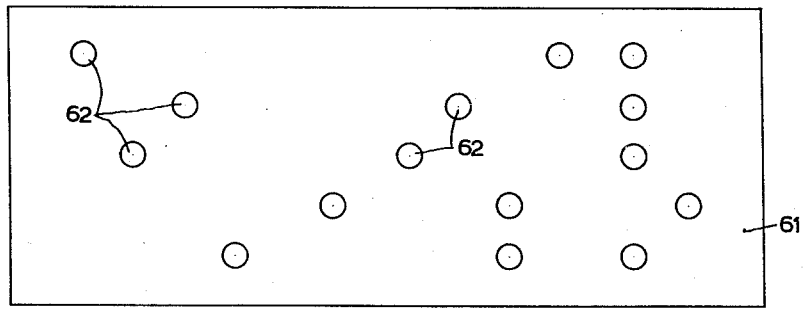
Fig. 5
INVENTOR:
PAUL VOLK
BY C. M. Avery
ATT'Y Patented May 4, 1954

2,677,285

UNITED STATES PATENT OFFICE 2,677,285

SPEED CONTROL APPARATUS FOR MACHINE DRIVES

Paul Volk, Erlangen, Germany, assignor to Siemens-Schuckertwerke, Aktiengesellschaft, Berlin-Siemensstadt and Erlangen, Germany, a German corporation Application May 23, 1951, Serial No. 227,830

Claims priority, application Germany November 7, 1950

9 Claims. (Cl. 74—472)

My invention relates to electric apparatus for position-responsively controlling the working speed of one or more movable parts in fabricating or other machinery and is hereinafter described with reference to the example of a drive for a turret lathe although the invention is not limited to this particular application.

A turret lathe is called upon to sequentially perform a number of different machining operations, such as roughing, finishing, boring, threading and cutting, each operation requiring particular operating conditions. One operation may have to be carried out at a slow turning speed and a slow speed of tool feed; for another operation the proper turning speed may be high but the feeding speed must remain slow; a third operation may require a high turning speed and also a rapid tool feed. Consequently, each operation, and hence each corresponding revolutionary position of the turret, requires a particular speed setting often not only for a single machine part such as the main drive but for a plurality of parts, for instance, the main drive and the tool feed drive.

It has been proposed to connect a cylindrical actuating member of an electric switching device with the turret of a lathe so that various cams or dog pins of the member, depending upon the turret position, actuate electric contacts in the circuits of the speed-control means of the machine drive. Such devices require an undesirably large number of individual switch units, occupy considerable space on the machine tool, and leave much to be desired as regards ease of adjustments for various job settings of the machine. This will be recognized from the fact that when, for instance, three control commands must be given, as for setting the motor speed and the transmission ratio of the main drive and setting the speed of the tool feed, three switches must simultaneously be closed in the device in any one of the positions of the turret-controlled actuating member.

It is an object of my invention to remedy these deficiencies and to provide a presettable speed control apparatus that requires only one control command for each complete speed setting of one or any plurality of correlated drive motors.

According to the invention, a motor control apparatus for controlling a plurality of presettable speed adjustments of a machine drive is equipped with a single control contact for each of the available machine settings and transmits the single command, issued by the one contact effective at a time, to a manifold-connected terminal field which distributes the command to a pre-set group of speed control means. When combining the control contacts in a switching device joined with the turret of a lathe, for instance, the actual distribution of the speed commands is no longer effected by the turret-positioned switching device proper but is assigned to the separately serviceable field of terminals. This results not only in a simplified and more reliable design of the motor control apparatus but also facilitates presetting and changing the control program because a terminal field is more easily and more completely accessible and supervisable than the switch actuating members with cams or pins previously proposed. For further simplifying the pre-adjustment of any desired speed program and for safely avoiding inaccuracies, a perforated stencil may be provided which, when placed upon the terminal field, leaves only those terminals accessible that are to be joined or actuated for the particular machining job to be set up.

The foregoing and other objects, advantages and features of my invention will be apparent from the embodiment of a motor control apparatus for a turret lathe illustrated by way of example on the accompanying drawings and described in the following. In the drawing:

Fig. 1 shows schematically the turret lathe equipped with motor control apparatus according to the invention;

Fig. 2 shows schematically one of the pertaining drive units comprising an electric motor and a speed change gearing;

Fig. 3 shows schematically a contact device of the control apparatus;

Fig. 5 illustrates a stencil plate applicable for setting the terminal field of the apparatus in accordance with a predetermined program.

Figure 4:
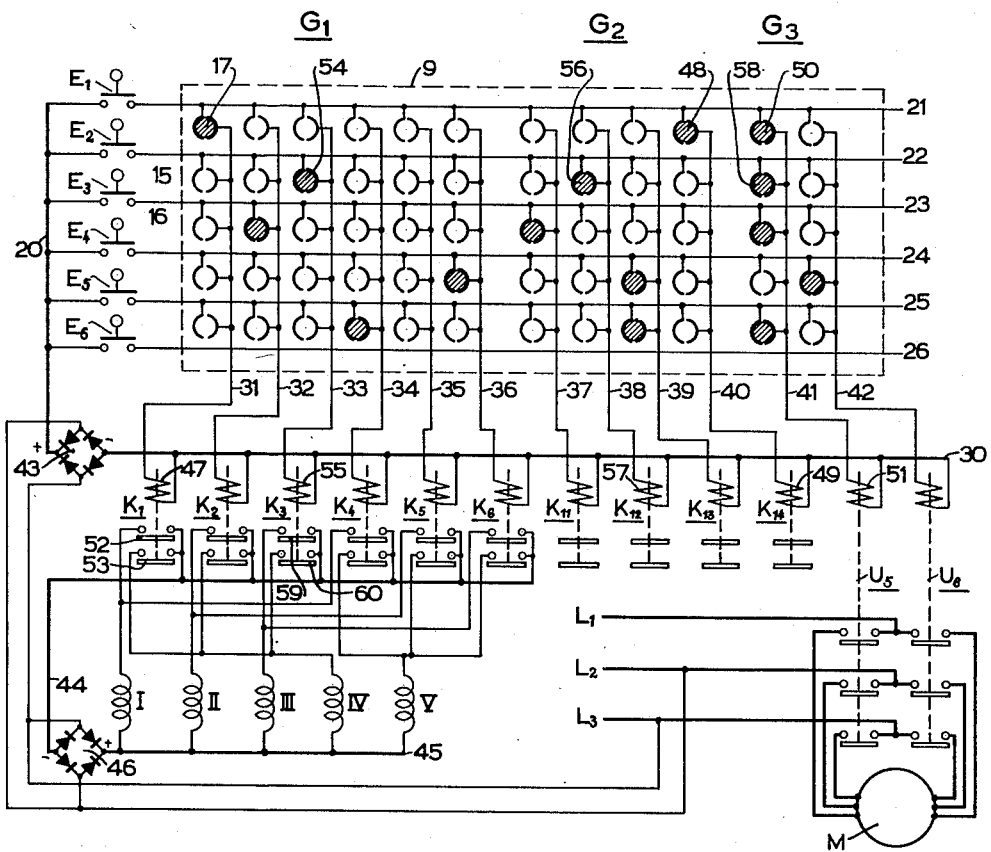
Fig. 4 is a complete circuit diagram of the control apparatus.

The turret lathe shown in Fig. 1 is equipped with a main drive motor M and a feed drive motor M'. The main motor M drives through a speed change gearing, disposed in a housing 1, the chuck 2 of the lathe. The feed motor M' is joined with a speed-change transmission gearing in a housing 3 and drives the feed spindle 4 of the lathe. A support 5 for the tool carrying turret 6 of the lathe is joined with the spindle 4 to perform a translatory movement along the lathe at a speed depending upon the adjustment of the transmission ratio of the feed motor gearing. Also mounted on the support 5 is a switching device 7 which, for each position of the turret, issues a single control command for setting the desired correlated speeds of main drive and feed drive in accordance with a preset speed program corresponding to a particular machining job. A control board or cabinet 8 is mounted near or at the machine tool and is equipped with a switchboard type panel 9 representing a readily accessible field of terminals on which the just-mentioned speed program is to be set up. The board or cabinet 8 may also be equipped with a main switch 10 for energizing and deenergizing the motor control system and may include the customary protective and other accessory devices (not illustrated).

It is assumed that the main drive of the machine tool has a total of twelve selective speeds. In the illustrated example, these twelve speeds are obtained from a pole-switchable two-speed motor in conjunction with a two-stage transmission gearing of six selective transmission ratios as is apparent from Fig. 2. The motor M has two field windings wound for respective different numbers of poles of a 2:1 pole ratio, thus permitting the motor to operate at two synchronous speeds of which one is twice as large as the other. To set the motor for one or the other speed, the corresponding one of two motor contactors U5 and U6 is closed. Keyed to the shaft 11 of motor M are three spur gears 111, 112, and 113 meshing with respective spur gears 121, 122, 123 that are freely revolvable on an intermediate shaft 12 and may be individually coupled with shaft 12 by respective electromagnetic couplings I, II, III. Keyed to shaft 12 are spur gears 124, 125 which mesh with respective spur gears 131, 132 revolvably mounted on the drive shaft 13 for the machine chuck. Gears 131 and 132 may be selectively coupled with shaft 13 by respective electromagnetic couplings IV and V. The just-mentioned couplings I to V are represented in the circuit diagram of Fig. 4 by their respective magnetizing control coils which are likewise denoted by I to V. Depending upon which one of couplings I, II, III on shaft 12 is energized and closed at a time and which of the couplings IV and V is energized simultaneously, six different speeds are imparted to the output shaft 13 for any given speed of the motor, and since the motor M can be adjusted to two speeds, the above-mentioned total of twelve selective speed steps is available, all of these speeds being properly graduated over the available range.

For the purpose of illustration, it is further assumed that the feed drive has only four selective speed steps all obtained by a magnetically controllable speed change transmission similar, in principle, to the transmission shown in Fig. 2 and hence not separately illustrated. The motor M' therefore always operates at a fixed speed.

The above-mentioned switching device 7 (Fig. 1), joined with the turret 6, has a disc shaped revolvable member 14 (Fig. 3) coupled with the turret so that it revolves equal angular amounts together with the turret. The member 14 carries six contact means consisting of individual normally open switches E1 to E6. In each position of member 14, and hence in each operating position of the turret, one of the respective switches E1 to E6 is engaged by a stationary cam member N so that the switch contact is closed. In the illustrated position, for instance, the switch E1 is closed and all other switches E2 to E6 are open. When the turret moves 60°, member 14 moves an equal angular amount in the counterclockwise direction so that then only the switch E2 is closed, and so forth. It is of course also possible, and in many cases preferable, to reverse the contact arrangement so that the cam member is revolvable while the switches E1 to E6 are stationary. In the circuit diagram of Fig. 4 the six switches E1 to E6 are schematically represented in conjunction with the terminal field 9.

According to Fig. 4 the terminal field has a multiplicity of individual terminals each composed of a pair of terminal members such as those denoted by 15 and 16. The terminal field is essentially a distributing panel or switch board and may have any of the manifold panel or switch board designs known for other distributing purposes. The individual terminals may be given any of the various known designs, using jacks, push buttons, plugs or the like manually operable devices for electrically joining the two members of each terminal. For simplicity of illustration, the two members of each terminal are shown in Fig. 4 as forming together a socket so that they may be interconnected by a connecting plug such as the one denoted by 17. The entire field comprises three groups of terminals. Group G1 pertains to the speed-change transmission of the main drive, group G2 to the speed-change transmission of the feed drive, and group G3 to the pole-switching contactors U5 and U6 of the main drive motor M. Of course, the invention is not limited to the control of a plurality of groups of speed settings but is also applicable in cases where only one group of speed settings is to be controlled such as the speeds of only the main drive. The terminals of the field panel are manifold connected between two current supply leads 20 and 30 in the following manner. Lead 20 is connected under control by switch E1 to a manifold conductor 21 to which is attached one of the members of each terminal in the upper horizontal row. One member of each terminal in the next lower horizontal row is connected to a manifold conductor 22 which is joined with lead 20 under control by switch E2. One member of each other terminal is similarly connected by manifold conductors 23 to 26 with switches E3 to E6. In the illustrated example, the last turret position is not used and, consequently, the switch E6 is not utilized for control purposes. For that reason, the terminals pertaining to manifold conductor 26 are not shown.

The remaining second members of the terminals are connected by manifold conductors 31 through 42 with the current supply lead 30 through the respective coils of electromagnetic control means, one of the conductors being provided for each of the respective vertical rows of terminals. The electromagnetic control means include respective relays K1 to K6, K11 to K14 and the above-mentioned pole-switching contactors U5 and U6 of motor M. The leads 20 and 30 may be energized from any suitable A. C. or D. C. source. In the illustrated example, the energization is supplied by a rectifier 43 whose input circuit is connected across two of the leads L1, L2, L3 of an alternating current bus for energizing the motor M. Relays K1 to K6 control the energization of the magnetic couplings (coils) I to V from the leads 44 and 45 of an energizing circuit also shown to be energized from the alternating current supply line though through a separate rectifier 46.

With a speed program set up on the terminal field as illustrated in Fig. 4 by the plugs shown cross-hatched, the control apparatus operates as follows:

When, in accordance with Fig. 3, the switch E1 is closed, a current path is completed from positive lead 20 through switch E1 and the terminal connector member 17 to lead 31 and winding 47 of relay K1 to negative lead 30. A second current path extends from lead 20 through switch E1, conductor 21, terminal 48, conductor 40 and winding 49 of relay K14 to lead 30. A third current path from lead 20 is closed through switch E1, terminal 50, conductor 41 and winding 51 of contactor U5 to lead 30. Consequently, relays K1, K14 and contactor U5 are simultaneously energized and close their respective contacts. Relay K1 energizes the magnetic coupling I through contact 52, and contact 53 of relay K1 energizes the magnetic coupling IV. Consequently, now the first gear step I—IV of the main drive transmission is switched in. The contacts of contactor U5 now connect the motor M to the line L1, L2, L3 for operation with a high number of poles and therefore at low motor speed. At the same time, the relay K14 adjusts the gear transmission of the feed motor M' for the desired speed, the necessary circuit connections being not illustrated as they may be similar to those between relays K1 to K6 and the magnetic couplings of the main drive.

If now the switch member 14 (Fig. 3) is turned 60°, switch E1 opens and switch E2 closes. Now, the terminal 54 connects winding 55 of relay K3 between the current supply leads 20 and 30, and terminal 56 energizes the winding 57 of relay K12, while coil 51 of contactor U5 remains energized through terminal 51. Contact 59 of relay K3 energizes the magnetic coupling III. Contact 60 of the same relay simultaneously energizes the coupling IV. Consequently, the main motor M is now coupled through the speed step III—IV with the chuck drive shaft while running at the same low speed as during the previous stage of operation.

During further sequential positions of the member 14 the respective other switch contacts are sequentially closed, each time setting the main drive and the feed drive to preselected and correlated speeds in accordance with the program set up on the terminal panel.

The above described example illustrates how large a number of control possibilities is afforded by inserting the manifold terminal field between the control contact means and the speed controlling devices of the apparatus. It is also apparent that a minimum of material and circuit components are required and that it is easy to set any desired speed program even for a complicated machine drive.

As mentioned, for facilitating setting and changing a speed program for a complete sequence of operations, a stencil type accessory device may be provided. Such a stencil device 61, as shown in Fig. 5, has a number of perforations 62, so arranged that, when the stencil plate is placed over the terminal panel, the individual perforations match those terminals that are to be effective. The stencil plate is prepared beforehand for each particular machining job, so that the operator of the machine when setting it up for a new job is merely called upon to place the stencil plate upon the panel and to introduce connecting plugs only into those terminal sockets, or to actuate only those jacks or buttons, that remain accessible through the perforations 62 of the stencil. Thereafter the stencil plate may be removed from the terminal panel. This not only facilitates the setting up of the control apparatus but also minimizes the errors.

It will be understood from the foregoing that control apparatus according to the invention may be modified in various respects and may be embodied in circuit connections and with the aid of circuit components other than those specifically illustrated and described, without departing from the essence of my invention and within the scope of claims annexed hereto.

I claim:

1. Speed control apparatus for machine drives, comprising adjustable-speed drive means having an electric motor and speed-change transmission means, said motor being electrically adjustable and having a plurality of first control means for setting it to respectively different motor operations, said transmission means having a plurality of second electric control means for setting the transmission ratio so that the output revolution of said drive means depends upon which first and second control means are jointly in effect at a time, a control device having a stepwise displaceable member connected when in operation with the machine to be driven and having different positions corresponding to the number of desired settings of said drive means, said control device having respective switch means each being operative in one of said respective positions, current supply leads, and a manifold terminal panel having groups of terminal pairs, each group being electrically disposed between said leads in series with one of said respective switch means and in series with one of said respective first and second control means, and a number of selectively settable connecting means interconnecting the terminals of selected pairs to preset said drive means for control by said respective switch means.

2. Speed control apparatus for machine drives, comprising adjustable-speed drive means having a plural-speed pole-switchable motor and a speed-change transmission in driven connection with said motor, said motor having a plurality of first electric control means for setting it to one of its respective speeds, said transmission having a plurality of second electric control means for setting the transmission ratio so that the output speed of said drive means depends upon which first and second control means are in effect at the same time, a contact device having a number of switch means corresponding to the number of available speed settings and having a movable member in actuating connection with said switch means to actuate one of said respective switch means dependent upon the position of said member, current supply leads, and a manifold terminal panel having groups of terminal pairs, each group being electrically disposed between said leads in series with one of said respective switch means and in series with one of said respective first and second control means, and a number of selectively settable connecting means interconnecting the terminals of selected pairs to preset the speeds of said drive means correlated to said respective switch means.

3. Speed control apparatus for machine tools having a main drive and a feed drive, comprising main drive speed adjusting means having a group of selectively operable control means corresponding to respectively different speeds, feed-drive speed-adjusting means having another group of selectively operable control means corresponding to respectively different speeds, a contact device having a number of switch means corresponding to the number of available settings of machine operation, current supply leads, a manifold terminal field having groups of terminal pairs, each group being electrically disposed between said leads in series connection with one of said respective switch means and in series connection with one of said respective contact means, and a number of selectively applicable connecting means interconnecting the two terminals of selected pairs to set correlated main drive and feed drive speeds respectively for said respective switch means.

4. Speed drive control apparatus for fabricating machines having a main drive and a feed drive and a movable machine structure positionally adjustable for different machine operations, comprising main-drive speed adjusting means having a number of selectively operable control means corresponding to respectively different drive speeds, feed-drive speed adjusting means having a number of selectively operable control means corresponding to respectively different feed speeds, a contact device having a movable member positionally responsive to the movable machine structure and having a number of switch means selectively controllable by said member in dependence upon the position of said member, a manifold terminal field having two groups of selectively closable contact pairs, one of said groups having its terminal pairs electrically connected between respective ones of said first control means and respective ones of said switch means, said other group having its terminal pairs electrically connected between respective ones of said second control means and the same respective switch means to which said terminal pairs of said one group are connected, whereby the closed pairs of said two groups determine selectively correlated speeds of main drive and feed drive for each position of said member.

5. Speed drive control apparatus for machine tools, comprising an electric main drive having selectively operable first control means for setting respectively different drive speeds, a feed drive having selectively operable second control means for setting respectively different feed speeds, a contact device having switch contacts and having a member movable between different positions for sequentially actuating said switch contacts in accordance with a desired machine operation, current supply leads, a manifold terminal panel having groups of terminal pairs connected between said leads in series with said respective switch contacts and in series with said respective first and second control means, one of said groups having a number of terminal pairs equal to the number of said first control means connected to one of said respective switch contacts, and another one of said groups having a number of terminal pairs equal to the number of said second control means also connected to said one switch contact, said other switch contacts being connected to the same respective numbers of other terminal pairs in said two groups, and selectively settable connecting means interconnecting the terminals of selected pairs in each of said two groups for presetting the main-drive speed and the feed speed to be jointly effective for each position of said movable member.

6. Apparatus according to claim 5, comprising a stencil plate placeable upon said terminal panel and having openings matching the pairs whose terminals are to be interconnected by said connecting means for a desired speed setup of said drive means, so that only said latter pairs of terminals are accessible through said openings.

7. With apparatus according to claim 5, in combination, a stencil plate placeable upon said terminal panel and having perforations matching the pairs whose terminals are to be interconnected by said connecting means for a desired speed setup of said drive means, and said connecting means comprising respective contact plugs insertable through said perforations between the terminals of said matching pairs respectively.

8. Speed drive control apparatus for a turret lathe or the like machine tool having a revolvable machine part whose positions determine respective machine operations, comprising an adjustable-speed main drive having selectively operable first control means for setting said drive to respectively different speeds, a feed drive having selectively operable second control means for setting respectively different feed speeds, a contact device having a number of switch means corresponding to the number of available positions of the revolvable machine part and having a member revolvable in dependence upon revolution of the machine part, said member being in controlling connection with said switch means for sequentially controlling said switch means so that a different one of said switch means is closed for each position of the machine part, current supply leads, and a manifold terminal panel having groups of terminal pairs, each group having as many rows as said contact device has switch means, and each row in each group being connected between said leads in series with one of said respective switch means, each terminal pair in each row of one group being series connected with one of said respective first control means, each terminal in each row of another group being series connected with one of said respective second control means, and a number of selectively settable connecting means interconnecting the terminals of selected pairs in each group to preset selectively correlated main and feed speeds for the respective positions of said member.

9. In speed drive control apparatus according to claim 5, one of said drives having a motor electrically adjustable to different operations and having third control means selectively operable for setting said motor to said respective operations, said panel having a further group of terminal pairs, said further group having rows of terminals connected with said respective switch means, and each of said latter rows having its terminal pairs connected across said leads in series with said respective third control means and in series with said respective switch means.

References Cited in the file of this patent

UNITED STATES PATENTS

| Number | Name | Date |
|---|---|---|
| 1,269,489 | Murphy | June 11, 1918 |
| 2,050,719 | McClure | Aug. 11, 1936 |
| 2,100,609 | Mitchell | Nov. 30, 1937 |
| 2,124,195 | Jones | July 19, 1938 |
| 2,186,254 | Mahnke | Jan. 9, 1940 |
| 2,376,552 | Nelson et al. | May 22, 1945 |